United States Patent [19]

Fujita et al.

[11] Patent Number: 4,615,669
[45] Date of Patent: Oct. 7, 1986

[54] INJECTION MOLDING MACHINE

[75] Inventors: Shigeru Fujita; Yukio Takanashi; Hiroshi Kanno, all of Numazu, Japan

[73] Assignee: Toshiba Kikai Kabushiki Kaisha, Tokyo, Japan

[21] Appl. No.: 702,611

[22] Filed: Feb. 19, 1985

[30] Foreign Application Priority Data

Feb. 21, 1984 [JP] Japan ................... 59-30967

[51] Int. Cl.$^4$ ............................................ B29C 45/22
[52] U.S. Cl. ................................... 425/147; 425/157; 425/547; 425/589
[58] Field of Search ............... 425/135, 147, 155, 157, 425/542, 547, 589, 591, 593

[56] References Cited

FOREIGN PATENT DOCUMENTS 38639 1/1963 Japan ................................. 425/157
2119307 11/1983 United Kingdom .

Primary Examiner—Jay H. Woo
Assistant Examiner—Timothy W. Heitbrink
Attorney, Agent, or Firm—Stevens, Davis, Miller & Mosher

[57] ABSTRACT

An injection apparatus of an injection molding machine includes a heating cylinder and a screw disposed in the heating cylinder, and the screw is axially moved and rotated in the heating cylinder for plasticizing the molten material by mechanisms or devices assembled in the injection apparatus, which is driven by electric drive means through driving power transmission means. The electric drive means comprises two servomotors and the power transmission means comprises two power transmission mechanisms operatively connected to the servomotors respectively so that one of the two servomotors drives a mechanism for axially moving the screw through one of the two power transmission mechanisms and the other of the two servomotors drives a mechanism for rotating the screw through the other of the two power transmission mechanisms, parallelly or concurrently.

1 Claim, 4 Drawing Figures

INJECTION MOLDING MACHINE

BACKGROUND OF THE INVENTION

This invention relates to an injection molding machine driven by electric drive means, and more particularly, to the machine which can be driven concurrently by two servomotors.

Generally, a mold clamping apparatus and an injection apparatus of an injection molding machine are driven by hydraulic drive means or electric drive means. However, as well known in the art of this field, the energy efficiency obtained by utilizing the hydraulic drive means is lower than that obtained by the electric drive means, and the quick response to the speed change of a piston, for example, attained by the former means is inferior to that attained by the latter means. Accordingly, in an injection molding machine, it is desired to utilize the electric drive means as a drive source for finely adjusting and quickly responding to the operation of the machine.

For example, in a case where the injection molding machine is operated by the hydraulic driving means, a hydraulic pump is driven by an electric motor to operate an actuator such as a hydraulic piston-cylinder assembly or a hydraulic motor. However, the energy efficiency attained by using the hydraulic piston-cylinder assembly or by using the hydraulic motor is 70–75% or 55–60%, respectively, with respect to the energy efficiency attained by using the electric driving means, thus being not effective. In addition, resolving powers of a flow rate adjusting valve and a pressure adjusting valve located in a hydraulic operating circuit are limited, so that a speed and a pressure controlled by these control valves are not changed or controlled quickly with high precisions.

On the other hand, the injection molding machines operated by the electric driving means of the type disclosed, for example, in Japanese Patent Laid-open Publication Nos. 62030/1983 and 179630/1983, can eliminate the defects or problems described above in connection with the hydraulic drive means. The injection molding machines of the type disclosed in these Japanese prior patents include only one electric drive means as a driving source, so that it is considerably hard to sufficiently drive or rotate a screw in a plasticizing process which is the most important operation in the injection molding system simultaneously with the control of the back pressure when the screw is driven backwardly. These rotating and controlling operations had to be carried out consecutively, not simultaneously, in the prior art technique, thus being difficult to effectively shorten the time of molding cycle. In addition, when it is required to concurrently or parallelly carry out two or more operations of a mold opening-closing operation, injection compression foaming operation, injection formation operation of a thermosetting resin, and the like are not parallelly carried out during the plasticizing process by driving two different drive means associated with an injection molding machine.

SUMMARY OF THE INVENTION

An object of this invention is to eliminate diffects or disadvantages encountered with the prior art technique and to provide an improved injection molding machine capable of finely adjusting or controlling respective steps such as mold clamping, injection, screw rotation and like steps for the injection molding machine.

Another object of this invention is to provide an injection molding machine in which two servomotors are provided for carrying out the mold clamping operation, injection operation, plasticizing operation and so on by utilizing the servomotors parallelly or concurrently through power transmission gear trains and clutch means.

According to this invention for achieving these and other objects, there is provided an injection molding machine for manufacturing mold products from a molten material of the type comprising an injection apparatus including a heating cylinder, a screw disposed in the heating cylinder, a mechanism for axially moving the screw in the heating cylinder and a mechanism for rotating the screw for plasticizing the material, a drive means for electrically driving the injection molding machine, means for transmitting driving power from the drive means to the injection apparatus, and a mold opening and closing apparatus, and the injection molding machine is characterized in that the electric drive means comprises two servomotors and the power transmission means comprises two power transmission mechanisms operatively connected to the two servomotors respectively so that one of the servomotors drives the mechanism for axially moving the screw through one of the power transmission mechanisms and the other of the servomotors drives the mechanism for rotating the screw through the other of the power transmission mechanisms.

According to this invention characterized as described above, two servomotors are driven for parallelly or concurrently carrying out various operations for the injection molding process, so that the operations are effectively performed with high precision, and a quick response to the speed and pressure changes can be attained thereby to shorten the time of operation cycle of the injection molding process.

BRIEF DESCRIPTION OF THE DRAWINGS

In the accompanying drawings

DESCRIPTION OF THE PREFERRED EMBODIMENT

Figure 1:
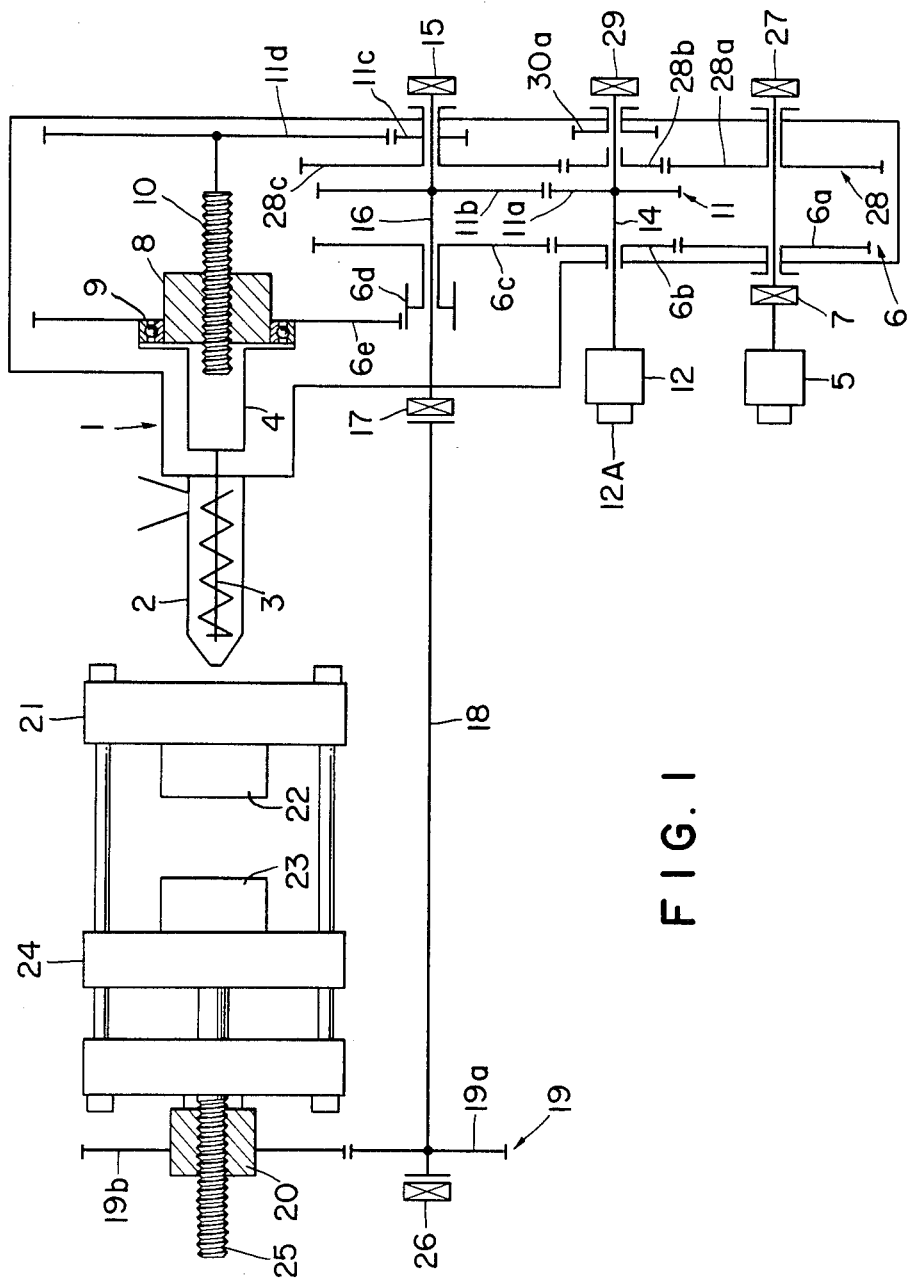
FIG. 1 is a diagrammatic view, partially in section, of an injection molding machine according to this invention.
Figure 2:
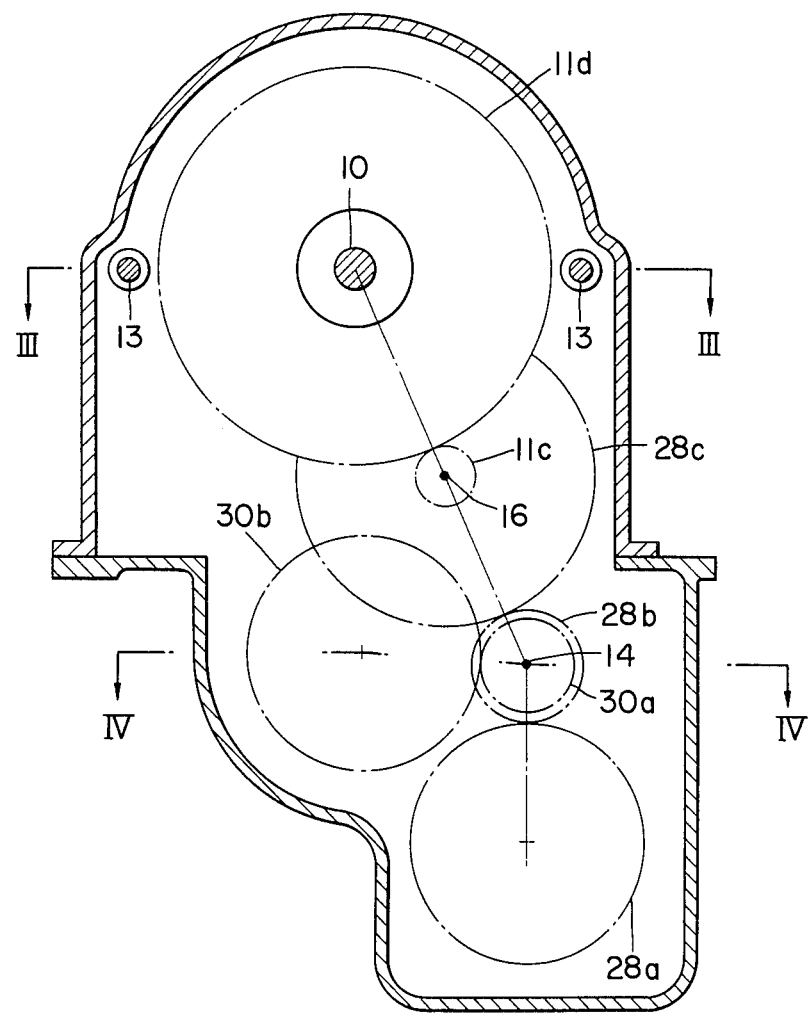
FIG. 2 is a diagrammatic side view as viewed rightwards of the machine shown in FIG. 1.

FIG. 1 is a schematic diagram of an injection molding machine according to this invention in which reference numeral 1 designates an injection apparatus including a heating cylinder 2 into which a screw 3 is located to be rotatable and movable in an axial direction of the heating cylinder 2. The screw 3 is secured at the rear end to a holder 4 provided with a gear 6e which constitutes a part of a power transmission gear train 6 (6a through 6e) for a servomotor 5 so that the screw 3 can be driven by the operation of the servomotor 5. The power transmission from the servomotor 5 to the gear train 6 is controlled by a clutch 7 disposed therebetween. A female screw unit 8 has an outer periphery journaled by the holder 4 through a bearing 9 so as to be rotatable regardless of the rotation of the holder 4 and also has an inner threaded surface meshed with threads of a male screw 10 supported not to be axially movable. The male screw 10 is secured to a gear 11d which constitutes a part of a power transmission gear train 11 (11a through 11d) for another servomotor 12 so that the female screw unit 8 meshed with the male screw 10 can be moved in a bilateral direction as viewed in FIG. 1 in accordance with the rotation of the gear 11 driven by the servomotor 12 when the screw 3 is driven. As can be understood from the above, the servomotor 12 is of a reversible rotation type to generate a reversible torque, and a rotation angle detector 12A secured to the rotation shaft 14 of the servomotor 12 can be controlled by a controlling means in which an operation condition is programmed.

Figure 3:
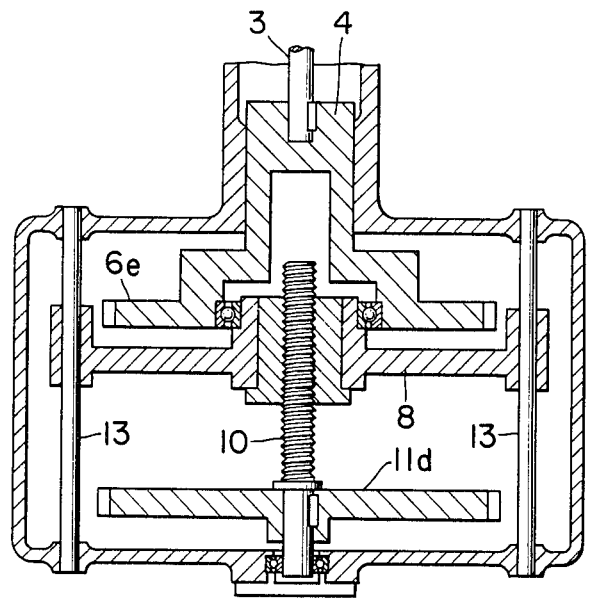
FIG. 3 shows a cross sectional view taken along the line III—III shown in FIG. 2.

The female screw unit 8 is provided with a guide shaft 13 (FIG. 3) for guiding the unit 8 when it is moved in the bilateral direction.

The gear train 11 includes a gear 11a which is secured to the power output shaft 14 of the servomotor 12, and when the shaft 14 is rotated by driving the servomotor 12, a gear 11b mounted to a shaft 16 can be rotated in engagement with the gear 11a. The rotation of the gear 11b is transmitted to a gear 11c through the connection of a clutch 15 and then to the gear 11d meshed with the gear 11c. A clutch 17 is secured to the shaft 16 to control the power transmission from the servomotor 12 to a power transmission shaft 18 through the gears 11a and 11b. A gear train 19 including gears 19a and 19b is driven and the power is transmitted from the power transmission shaft 18 to the gear 19a and in turn to a female screw unit 20 through the gear 19b. The female screw unit 20 is provided with a threaded inner surface which is meshed with threads of a male screw 25 secured to a movable plate 24 to which is secured a movable mold or mold half 23 relatively movable with respect to a stationary mold or mold half 22 secured to a stationary plate 21. When the gear 19b is rotated in response to the drive of the servomotor 12 through the transmission mechanism, the female screw unit 20 meshed with the gear 19b is rotated and in turn the male screw 25 is rotated thereby to move the movable plate 24 to carry out the mold clamping and loosening operations between the movable and stationary molds 23 and 22.

A brrake unit 26 operates such that when the movable and stationary molds 23 and 22 are clamped with a predetermined mold clamping force and the driving power of the servomotor 12 is released by disconnecting the clutch 17, the mold clamping mechanism including the molds 23 and 22 and the plates 24 and 21 can maintain the predetermined clamping force after the driving power has been released.

A clutch 27 operates to transmit the driving power of the servomotor 5 to the gear train 11 through a gear train 28 (28a through 28c), and the driving power from the servomotor 5 is first transmitted to the gear 28c through the gears 28a and 28b which are meshed with each other, whereby the gear 11c is driven in synchronism with the gear 28c. Accordingly, in the case where it is required to apply a relatively large injection pressure, the driving powers from the servomotors 5 and 12 are utilized parallelly and concurrently.

Figure 4:
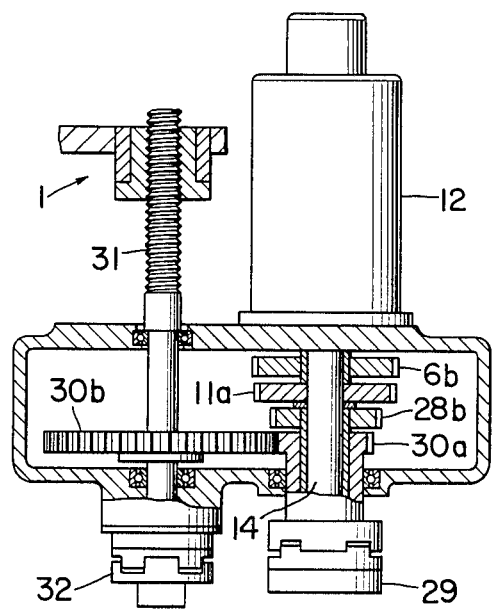
FIG. 4 shows a cross sectional view taken along the line IV—IV shown in FIG. 2.

A clutch 29 operates to control the transmission of the driving power between the power output shaft 14 of the servomotor 12 and a gear train 30 for moving the injection apparatus 1 to make the nozzle portion of the heating cylinder contact the inlet of the mold 22, and as shown in FIG. 4, the driving power is first transmitted to a gear 30a mounted to the shaft 14 and then to a gear 30b meshed with the gear 30a thereby to rotate a shaft 31 on which the gear 30b is mounted. In this manner, the nozzle portion of the heating cylinder 2 comes into contact with the inlet of the mold 22 or is moved backwardly therefrom. A brake unit 32 is provided for maintaining a force to make the nozzle portion of the heating cylinder contact the stationary mold even if the clutch 29 cuts off the power transmission from the servomotor 12.

The injection molding machine having the structure described above operates actually in the following manner.

When a material resin is fed into the heating cylinder 2 of the injection apparatus 1 to plasticize the resin therein, the clutch 7 operates to transmit the driving power of the servomotor 5 to the holder 4 through the gear train 6 thereby to rotate the screw 3. The material resin in the heating cylinder 2 is heated and melted by a heater disposed on the outer periphery of the heating cylinder 2 during the time when the resin is fed into a space defined in the front portion of the heating cylinder and the molten resin is then stored in the space. While the molten resin having been fed forwardly, the screw 3 is somewhat retired by the reaction pressure of the molten resin stored in the space. At this time, since the male screw 10 itself is prohibited to move axially, the female screw unit 8 engaged with the male screw 10 is moved backwardly while being rotated thereon. The rotation of the female screw unit 8 is transmitted to the power transmission shaft 16 through the connection of the clutch 15 and then to the servomotor 12 through the gear 11b mounted on the shaft 16 and the gear 11a mounted on the rotation shaft 14 of the servomotor 12. Since the servomotor 12 can generate the reversible torque, the resistance to the backward movement of the screw 3, i.e. the back pressure of the screw, can be optionally determined by adjusting the setting torque to a required value. The back pressure of the screw 3 can be applied as a zero value or negative value as well as a positive value. According to this fact, the measuring step of the resin in the plasticizing process may be facilitated and the plasticization can be uniformly carried out. The desired distance to be retired of the screw 3, i.e. the measuring stroke thereof, can be set to a rotation angle detector 12A attached to the shaft 14 of the servomotor 12 and the measuring step is completed when the screw 3 is moved backwardly by the distance set in the rotation angle detector 12A.

After completion of the measuring step, the clutch 17 is connected so as to transmit the driving power of the servomotor 12 to the moving plate 24 of the molding apparatus through the power transmission shaft 18, gear train 19 and the female screw unit 20, thus moving forwardly, i.e. rightwards as viewed in FIG. 1 thereby to clamp the molds 23 and 22. When the mold clamping force reaches the predetermined value, the brake unit 26 operates to maintain the clamping force as it is. Then the servomotor 12 stops and the connection of the clutch 17 is released. The clutch 29 is then connected to drive the shaft 31 through the gear train 30 as shown in FIG. 4 thereby to move forwardly the injection apparatus 1 so that the nozzle portion of the heating cylinder 2 contacts an inlet of the stationary mold 22. When the nozzle portion contacts the inlet of the mold 22, the brake unit 32 operates so as to maintain the contacting force of the nozzle portion and then the connection of the clutch 29 is released.

In the next step, when the clutch 15 operates, the revolution number of the servomotor 12 changes in accordance with the moved position of the screw 3 detected by the rotation angle detector 12A, and accordingly, the revolution number of the male screw 10 changes thereby to move forwardly, i.e. leftwards as viewed in FIG. 1, the female screw unit 8 on the male screw 10 at a predetermined speed. Thus, the screw 3 moves forwardly in accordance with the preliminarily programmed speed and the molten resin is injected into the mold cavity by a measured amount. The molten resin is thus filled into the mold cavity formed by the clamped molds 22 and 23 and after the filling operation, the torque of the servomotor 12 is controlled by the preliminarily set program for applying pressure in response to the cooling speed of the molten resin in the mold cavity.

For this injection process, if it is required to inject the molten resin with considerably large pressure, the clutch 7 is connected to operate the servomotor 5 so that the two servomotors 5 and 12 are utilized synchronously and concurrently for injecting the molten resin.

After completion of the injection step, the molten resin measurement step for the plasticization of the resin is again performed to measure the necessary amount of the molten resin, and the revolution number of the screw 3 and the back pressure thereof during this measuring step are also controlled by setting a program preliminarily.

After completion of this measuring step, the brake unit 32 is released and the clutch 27 is again operated to reversely drive the servomotor 12 to retire the nozzle portion of the heating cylinder 2 by the necessary distance from the inlet of the mold 22. In this operation, it is required to prevent the molten resin from flowing out from the nozzle portion, and for this purpose, it is effective to carry out the so-called suck-back operation in which the screw 3 is retired slightly beforehand the retirement of the nozzle portion by a distance smaller than the measuring stroke to reduce the pressure of the measured molten resin. The suck-back operation is generally carried out by a manner reverse to that of the injection step; namely, the clutch 15 or 27 is first operated and the servomotor 12 or 5 is driven in the direction reverse to that in the injection step to retire the screw 3 by the necessary distance.

After the resin filled in the mold cavity has been completely cooled, the brake unit 26 is released and the clutch 17 is again operated to drive the servomotor 12 so as to backwardly move the movable plate 24 to open the molds 22 and 23. The molded product in the mold 23 is pushed out therefrom at the backward limit position of the movable plate 24 by a push-out mechanism, not shown. According to the processes or steps described above, one injection molding cycle is completed.

During the mold opening process, molded product pushing-out process, and mold closing process of the next injection molding cycle, the measured material resin is heated in the heating cylinder 2 and the molten resin tends to swell and flow out from the nozzle portion of the heating cylinder. In order to eliminate this adverse phenomenon, during these steps, the clutch 27 is operated to establish the operative connection among the servomotor 5, the gear train 28 and the gears 11c and 11d of the gear train 11 for the injection process, so that the screw position is finely controlled to always maintain a suitable pressure of the material resin.

Various advantages and features attained by the injection molding machine according to this invention will be summarized hereunder.

All processes or steps in the injection molding procedure can be carried out by driving the servomotors, so that the high energy efficiency of about 90-95% can be obtained, thus performing all the processes with high precision. The back pressure of the injection screw during the plasticization measuring process can be controlled so as to have a value between the zero value and an optional positive value and even a negative value thereby to uniformly heat and melt the material resin and improve the plasticizing ability. In addition, since the plasticizing process and the mold clamping or loosening process are carried out parallelly at the same time, it is possible to shorten the time for the molding cycle in which the plasticizing process is not completed during the cooling time of the resin filled in the mold cavity. Since the injection process and the mold opening or closing process can be carried out parallelly at the same time, it is possible to perform the injection compression necessary for the mold clamping operation just before completion of the injection process and also possible to perform the foaming formation necessary for the mold opening operation immediately after completion or just before or after completion of the injection process, and to perform the formation of the thermosetting resin necessary for the mold loosening or opening operation for exhausting gas just before completion of the injection process. Moreover, since the resin plasticization measuring process in which the screw is rotated and the injection process in which the screw is moved forwardly are carried out parallelly at the same time, it is even possible to produce a product having a volume over the predetermined maximum measured injection amount by the rotation injection operation. Moreover, since two servomotors are concurrently utilized for the injection operation, the increased driving power can be utilized for every step of the injection molding or mold clamping or loosening operation described hereinabove.

What is claimed is:

1. An injection molding machine for manufacturing mold products from a molten material, comprising:
   an injection apparatus including a heating cylinder, a screw disposed in said heating cylinder, and means for axially moving said screw in said heating cylinder for injecting the molten material;
   screw rotating means for rotating said screw for plasticizing the material;
   drive means for electrically driving the injection molding machine;
   means for transmitting driving power from said drive means to said injection apparatus; and
   a mold opening and closing apparatus;
   said drive means comprising first servomotor and a second servomotor and said power transmission means comprising three power transmission mechanisms operatively connected to said first servomotor and said second servomotor respectively, so that said first servomotor drives one of said injection apparatus, said screw rotating means and said mold opening and closing apparatus through one of said power transmission mechanisms, and said second servomotor drives one of the other of said injection apparatus, said screw rotating means and said mold opening and closing apparatus through one of the other two of said three power transmission mechanisms, said first servomotor and said second servomotor being operatively connected to at least one of said injection apparatus, said screw rotating means and said mold opening and closing apparatus through one of said power transmission mechanisms and a first clutch means operatively associated with said one power transmission mechanism, and said first servomotor and said second servomotor being operatively connected to one of said injection apparatus, said screw rotating means and said mold opening and closing apparatus through a second clutch means.

* * * * *